United States Patent
Moser et al.

(10) Patent No.: US 7,449,206 B2
(45) Date of Patent: Nov. 11, 2008

(54) METHOD FOR POST-HARVEST PROCESSING OF THE GREEN CICER BEAN

(75) Inventors: T. Douglas Moser, Genesee, ID (US); Foster C. Cronyn, Eagle, ID (US); Vernon Hawks, Centralia, WA (US)

(73) Assignee: TD Moser Farms, L.L.C., Genesee, ID (US)

( * ) Notice: Subject to any disclaimer, the term of this patent is extended or adjusted under 35 U.S.C. 154(b) by 250 days.

(21) Appl. No.: 10/714,446

(22) Filed: Nov. 14, 2003

(65) Prior Publication Data

US 2005/0106298 A1     May 19, 2005

(51) Int. Cl.
*A23L 1/36* (2006.01)
(52) U.S. Cl. .................. 426/481; 426/629; 426/634
(58) Field of Classification Search ........... 426/481, 426/634, 629, 482
See application file for complete search history.

(56) References Cited

U.S. PATENT DOCUMENTS

| | | | | |
|---|---|---|---|---|
| 2,694,489 A | * | 11/1954 | Nelson et al. ............. | 209/44.1 |
| 3,105,040 A | * | 9/1963 | Wood ....................... | 209/20 |
| 3,869,556 A | | 3/1975 | Rockland et al. | |
| 3,876,807 A | | 4/1975 | Wagner et al. | |
| 4,066,087 A | * | 1/1978 | Rodgers .................... | 460/142 |
| 4,084,016 A | | 4/1978 | Kon et al. | |
| 4,124,727 A | | 11/1978 | Rockland et al. | |
| 4,729,901 A | | 3/1988 | Rockland et al. | |
| 4,735,816 A | | 4/1988 | Sterner et al. | |
| 4,900,578 A | | 2/1990 | Bakker et al. | |
| 5,151,285 A | | 9/1992 | Williams et al. | |
| 5,296,253 A | | 3/1994 | Lusas et al. | |
| 5,364,471 A | | 11/1994 | Czuchajowska et al. | |
| 5,545,425 A | | 8/1996 | Wu | |
| 5,725,902 A | | 3/1998 | Lesueur-Brymer et al. | |
| 5,744,188 A | | 4/1998 | Kolla et al. | |
| 5,769,238 A | * | 6/1998 | Gupta ....................... | 209/155 |
| 5,773,074 A | | 6/1998 | Veldkamp et al. | |
| 5,863,591 A | | 1/1999 | Seguin | |

(Continued)

OTHER PUBLICATIONS

Oplinger et al. Chickpea. Alternative Field Crops Manual. 1997 <URL=http://www.hort.purdue.edu/newcrop/afcm/chickpea.html>.*

(Continued)

*Primary Examiner*—Anthony Weier
(74) *Attorney, Agent, or Firm*—Christensen O'Connor Johnson Kindness PLLC

(57) ABSTRACT

The present invention relates to methods and apparatuses for processing podded vegetables including green Cicer beans. Green Cicer beans are commonly referred to as chickpeas and come in two varieties, Desi-type and Kabuli-type. The Kabuli-type of chickpeas are commonly referred to as garbanzo beans. Until the present invention, there was no commercial method or apparatus for post-harvest processing of green Cicer beans. The present invention can relate not only to post-harvest processing of green Cicer beans but any podded produce where there is a need to separate unwanted material from the green produce. Apparatuses and methods of the present invention permit secondary processing of podded vegetables to increase overall grower yield. Additionally, methods according to the present invention, show desired dwell times and blanching temperatures for the deactivation of enzymes that can damage green produce or render it unsaleable.

26 Claims, 6 Drawing Sheets

U.S. PATENT DOCUMENTS

| | | | |
|---|---|---|---|
| 5,916,624 | A | 6/1999 | Ajmera |
| 6,033,692 | A | 3/2000 | Chukwu |
| 6,042,863 | A | 3/2000 | George et al. |
| 6,090,433 | A | 7/2000 | Sterner et al. |
| 6,238,725 | B1 | 5/2001 | Bush et al. |
| 6,316,037 | B1 | 11/2001 | Takenawa |
| 6,355,291 | B1 | 3/2002 | Rose et al. |
| 6,465,031 | B1 | 10/2002 | Bush et al. |
| 2002/0136811 | A1 | 9/2002 | Borders et al. |

OTHER PUBLICATIONS

Brick et al. Garbanzo Bean Production Trials in Colorado and Wyoming. Technical Bulletin TB 98-2. Jun. 1998.*

STN Database Abstract: FSTA—AN: 1978(05):J0550. Rockland et al. from Food Product Development 1977. vol. 11. No. 3.*

STN Database Abstract: FSTA—AN 1994(06):J0141. Singh et al. from Journal of Food SCience and Technology, India. 1994. vol. 31, No. 1.*

STN Database Abstract: CA—AN 75:18842. Ramanathan et al from Journal of Food SCience and Technology. 1970 vol. 7, No. 4.*

FTC Food Technology webpage. Model TU-12 Field Portable Tenderometer. Published Feb. 21, 2003 <http://web.archive.org/web/20030221130931/foodtechcorp.com/tu12.htm>.*

Brick, M.A., et al., "Garbanzo Bean Production Trials in Colorado and Wyoming," Technical Bulletin TB 98-2, Colorado State University, Fort Collins, Colorado, Jun. 1998, pp. 1-26.

Oplinger, E.S., et al., "Chickpea (garbanzo bean)," *Alternative Field Crops Manual*, Purdue University, Center for New Crops & Plant Products, Nov. 17, 1997, <http://www.hort.purdue.edu/newcrop/afcm/chickpea.html> [retrieved Jan. 4, 2005], pp. 1-6.

Ramanathan, L.A., and B.S. Bhatia, "Dehydrated Green Bengal Gram (Cicer Arietinum)," *Journal of Food Science and Technology* 7(4):208-209, 1970 (abstract).

Rockland, L.B., et al., "Frozen Quick-Cooking Beans Prepared From Dry Beans," *Food Product Development* 11(3):34, 39-40, 1977 (abstract).

Singh, S., et al., "Effect of Natural Tannins on Canned Green Bengalgram (Cicer Arietinum)," *Journal of Food Science and Technology*, India 31(1):49-51, 1994 (abstract).

Berrada, A., "Results of Chickpea Research in Southwestern Colorado From 1994 to 2003," Agricultural Experiment Station, Colorado State University, Rocky Ford, Colo., *Technical Bulletin TV04-03*, Dec. 2004, 59 pages.

"Chickpeas," Saskatchewan Interactive-Agriculture-Alternative Crops, Dec. 14, 2002, <http://interactive.usask.ca/Ski/agriculture/crops/alternative/chickpea.html> [retrieved Nov. 10, 2006], 3 pages.

Corp, M., et al., *Chickpea Production Guide*, EM 8791-E, Oregon State University, Corvallis, Ore., Jan. 2004, 14 pages.

Muehlbauer, F. J., and A. Tullu, NewCROP FactSHEET: "*Cicer Arietinum* L.," Purdue University. Center for New Crops and Plant Products, Feb. 23, 1998, <http://www.hort.purdue.edu/newcrop/cropfactsheets/Chickpea.html> [retrieved Nov. 10, 2006], 9 pages.

Robinson, B., "Chickpea Production," Department of Primary Industries, Victoria, Australia, Sep. 14, 2004, <http://www.dse.vic.gov.au/dpi/nreninf.nsf/Link View/ . . . > [retrieved Nov. 10, 2006], 5 pages.

"Value-Added Products," © 2006 USA Dry Peas, Lentils, & Chickpeas, <http://www.pea-lentil.com/value-added.htm>, 2006, 6 pages.

* cited by examiner

METHOD FOR POST-HARVEST PROCESSING OF THE GREEN CICER BEAN

FIELD OF THE INVENTION

The present invention relates to processing green produce generally, and specifically to methods, apparatus, and systems for post-harvest processing of podded produce including green Cicer beans.

BACKGROUND OF THE INVENTION

Cicer beans (Cicer arietinum) are a high value crop adapted well for both dry land and irrigated cropping regions. Cicer beans are also known as chickpeas or hummus beans and they are an annual grain legume or "pulse crop" that originated in the Fertile Crescent of the Near East. Cicer beans were one of the first legumes cultivated by humans, dating to 7,000-6,000 B.C. Pulse crops, like Cicer beans, dry beans, dry peas, fava beans, lentils, and lupin, work with rhizobia bacteria to convert nitrogen from the atmosphere into nitrogen nodules on the plant roots. This process increases soil fertility in rotation with other crops such as wheat, barley and other cereal grains. Cicer beans are classified as "Desi" or "Kabuli" types based in part on seed size, color, thickness of the seed coat, and shape of the seed coat. Desi seed-types produce smaller seeds, generally 100 or more seeds per ounce when dried while Kabuli seed-types when dried can be as large as 38-40 seeds per ounce. Cicer beans have a thick and irregular-shaped seed coat which can range in color when dried from light tan to black. Popularly referred to as the "garbanzo bean," Kabuli-types produce larger seeds and have a seed coat with a paper-like thickness. Kabuli-types produce seeds with colors that range when dried from white to a pale cafe cream colored tan.

World production of the Cicer bean is roughly three times that of lentils and peas. Among other pulse crops marketed as human food, world Cicer bean consumption is second only to dry beans. Turkey, Australia, Syria, Mexico, Argentina, and Canada are the major Cicer bean exporters around the world. About 90% of Cicer beans, the majority of which are Desi-types, are consumed in India. Historically, North American Cicer bean production was confined to California and to a lesser extent, the Pacific Northwest. Recently, Cicer bean production has expanded into the northern Great Plains regions of Canada and the United States.

Cicer bean plants are erect with primary, secondary and tertiary branching, resembling a small bush. They flower profusely and have an indeterminate growth habit, continuing to flower and set pods as long as conditions are favorable. Pod set occurs on the primary and secondary branches and on the main stem. The individual round pods generally contain one seed in Kabuli-types and often two seeds in Desi-types. Cicer bean stems, leaves and seed pods are covered with small hair-like glandular structures that secrete malic and oxalate acids, which deter insect pests. Insect problems on Cicer beans have been minimal and insecticide applications generally have not been necessary.

Commercial Cicer bean production has heretofore been limited to dry beans, typically harvested at about 10% moisture when, for example, the Kabuli-type bean obtains a characteristic yellowish cream color. Crop loss can be high because swathing or other traditional combining techniques cut the dry Cicer bean plant at its stock and combines traditionally used for harvesting cereal crops are used to depod the product. Yield losses of up to 33% are not uncommon. Furthermore, the dry Cicer bean must undergo extensive rehydration in some instances for canning and transportation to world markets. Cicer beans are often damaged during dry harvesting and processing through breakage of the brittle bean's characteristic small protruding beak-like structure, substantially reducing the economic value of the crop.

In some areas of the world, green Cicer beans are harvested by hand and thereafter depodded by hand for fresh consumption. The green Cicer bean is a valuable crop both for its higher nutritional quality than that of the dry Cicer bean and its characteristic sweet taste and texture. World produce markets have experienced an increased demand for organic green produce, which, in turn, has increased market demand for the green Cicer bean. The known art lacks a commercially viable way to satisfy market demand for the green Cicer bean due primarily to agronomic, harvesting and processing challenges associated with commercial production of green Cicer beans.

The majority of Cicer beans are grown in arid areas of the world subjecting the crop to high temperatures during green harvest time. Green Cicer beans are highly susceptible to caramelization prior to harvest and processing. Caramelization is the process by which sugars in the green Cicer beans are scorched by high ambient temperatures. Caramelization of the green Cicer bean can occur at temperatures of 95° F. and higher. Scorched sugars in the green Cicer bean completely change the taste, color, and nutritional value of the product and render it commercially useless as a green commodity. If the green Cicer bean is exposed to caramelization temperatures, it may only be sold as a sub-standard dried commodity.

Commercial production of the green Cicer bean presents numerous other challenges apart from caramelization. The green Cicer bean pod is tight and leathery, requiring extensive gentle threshing in order to depod the product without damaging bean structure. Known threshing methods fail to open the leathery pod or otherwise remove the pod without damaging the green product. Because of the unique shape of the Cicer bean, various threshing challenges are created in order to preserve all features of the shape including the characteristic small protruding beak-like structure. In addition, the green Cicer bean is maturing in the field daily and is especially susceptible to change in color, texture and flavor. Accordingly, food processors and growers face a challenge to produce a marketable product that must be preserved at the peak of quality; as well as harvested and shipped to food processing plants under time-constrained circumstances. Moreover, processing green Cicer beans presents additional challenges related to the size of the green product. For example, Desi and Kabuli-types vary widely in size, however, both varieties reach maturity at the same time. The green Cicer bean also presents additional challenges to food processors in never-before-seen leaf trash, stem trash, & pods.

SUMMARY OF THE INVENTION

The invention includes methods of processing green Cicer beans including the steps of delivering the Cicer beans to a first processing line and thereafter separating unwanted material from the Cicer beans through the use of at least one vibrating screen and at least one flotation washer. A method of the present invention also includes a step of blanching the green Cicer beans for a predetermined temperature and for a predetermined dwell time and further includes freezing the green Cicer beans and grading the green Cicer beans according to consumer criteria. Additionally, a method of the invention includes packaging the green Cicer beans for storage and sale in consumer markets.

Methods of the present invention also include the steps of delivering the harvested green Cicer beans to a processing line, separating unwanted material from the Cicer beans, blanching the Cicer beans for a predetermined temperature for a predetermined dwell time, dehydrating the Cicer beans, grading the Cicer beans according to consumer criteria, and packaging the Cicer beans for storage and sale in consumer markets.

The invention also includes systems for processing green vegetables including a flotation washer in fluid communication with primary processing line. A system of the invention includes an adjustable screen that is generally positioned in a horizontal plane and has a plurality of adjustable openings that can be selectively adjusted based on the relative sizes of vegetables to be processed.

The invention also includes apparatuses for processing green vegetables including an adjustable screen. An adjustable screen useable with principles of the invention is positioned generally in a horizontal plane. The adjustable screen also includes a plurality of adjustable openings that are selectively adjusted based on the relative sizes of vegetables to be processed.

The invention also includes methods for processing green vegetables including the step of separating unwanted material from the vegetables to be processed through the use of an adjustable screen wherein the adjustable screen has a plurality of openings and wherein the plurality of openings are adapted to be selectively adjusted based on the relative sizes of vegetables to be processed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

I. Green Cicer Bean Processing Generally

Figure 1:
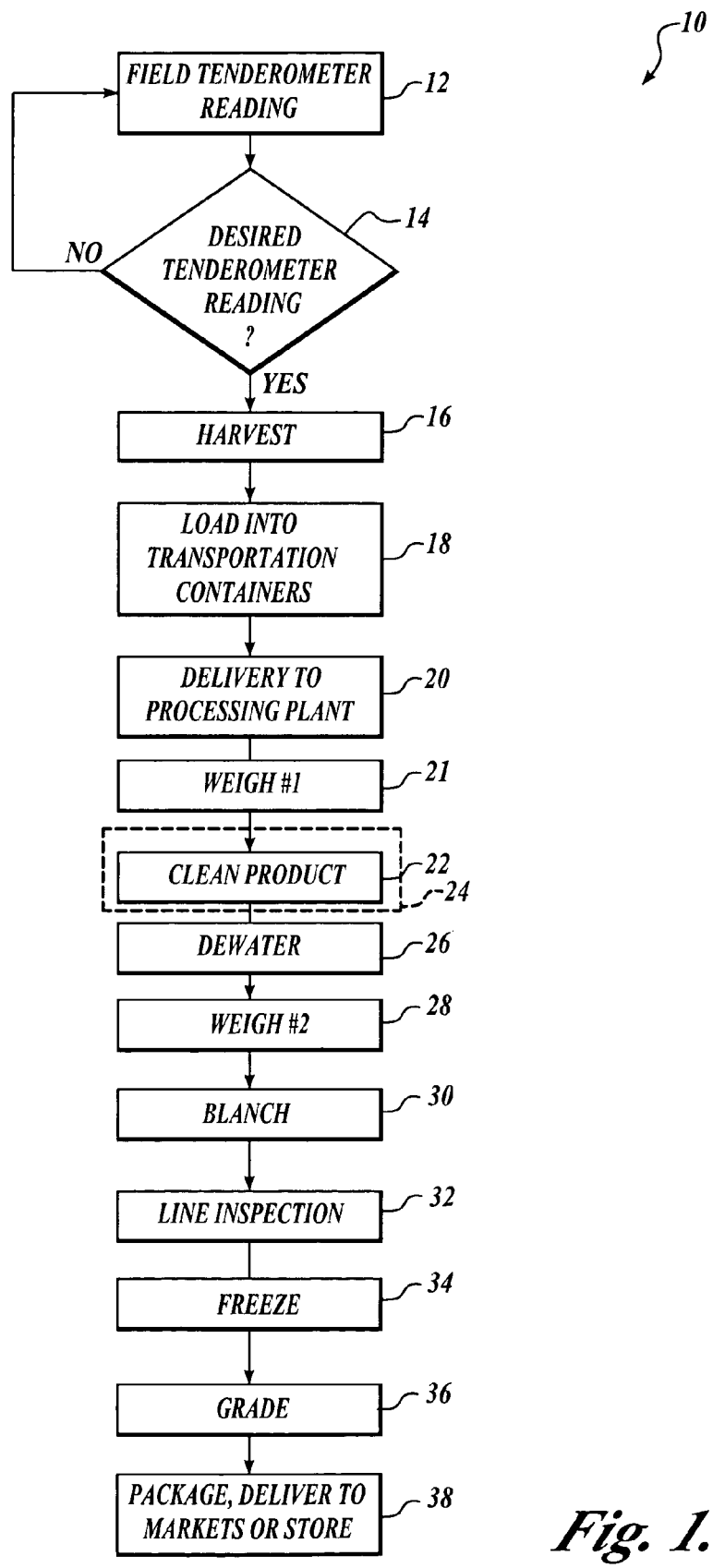
FIG. 1 is a flow diagram of a general method for processing green Cicer beans in accordance with one embodiment of the present invention.

Packaged fresh vegetables are brought to the consumer in a variety of ways and must meet consumer demand for safety, convenience and nutrition. Some processing methods include canning, freezing, refrigeration, dehydration (drying), and aseptic processing, such as purifying, pasteurizing, and placing product in preservative containers such as boxes or bags.

Processed fresh vegetables should be harvested at their peak of freshness so that certain desirable traits can be preserved. An important aspect of processing fresh vegetables and delivering the commodity to market involves systems designed to rid the produce of harmful bacteria that can cause illnesses. Heat treatments such as pasteurization and blanching work to rid organisms of harmful bacteria and further help to lock in freshness by inhibiting enzyme activity on the vegetables or produce.

One significant risk associated with the commercial production of the green Cicer bean is the loss of sugars in the green commodity due to sugar consumption during respiration and sugar overconversion to starch. At room temperature, some fresh vegetables liberate heat at a rate of 127,000 kilojoules per ton, per day. Since heat further deteriorates the product and speeds microorganism growth, harvested green Cicer beans should be held at cool temperatures after harvesting and processed as soon as reasonably possible. Refrigeration or general cooling does not completely prevent deterioration of the crop. Refrigeration of the green produce can slow the process of conversion from sugar to starch; however, there is still change that takes place when the produce is under refrigeration. The continual loss of water by harvested green Cicer beans due to transpiration, respiration and physical drying of cut surfaces results in the wilting, loss of plumpness and loss of weight, or all of the foregoing.

To ensure a steady supply of top quality produce during the harvesting period, commercial production of the green Cicer bean requires that certain agronomic practices be followed such that growing and spacing of the plantings allows the green Cicer beans to mature in rhythm with processing plant capabilities. Suitable methods for planting Cicer beans such that harvest of the green product can be timed with processing plant capabilities are disclosed by U.S. application Ser. No. 10/713,553, filed concurrently with the present application and hereby incorporated by reference in its entirety. One goal of Cicer bean production as a green commodity is to minimize stockpiling and the need for cold storage and to also minimize the risks associated with storing the green Cicer bean after harvesting but before processing.

In some areas, liquid nitrogen cooled trucks and/or hydrocooling stations may be provided for the transportation or storage of fresh produce to the processing plants or directly to market. Upon arrival of green Cicer beans at the processing plant, cleaning and grading operations are performed using equipment, and, in some capacity, hand labor is used to inspect the product and grade the product as discussed further below.

II. Methods of Processing Green Cicer Beans

FIG. 1 depicts a method 10 suitable for processing green Cicer beans in accordance with one embodiment of the present invention. While generally, method 10 could be used (according to separate parameters) for processing green peas or sweet corn, the inventors have improved upon known methods and have developed preferred operating parameters for determining ideal maturity, grading, blanching, dehydrating, and increasing overall yields to accommodate the green Cicer bean, as discussed further below.

The processing method 10 begins with taking a field tenderometer reading 12. A food processor and/or grower may conduct field tenderometer readings 12 to determine whether a given stand is ready for harvest. Whether a given stand is ready for harvest is determined according to data collected regarding desired maturity levels as driven by consumer preference. The field tenderometer can be any tenderometer such as those available from Food Technology Corporation, Model TU12, which is a portable field tenderometer typically used for reading maturity of green peas. Following an initial field tenderometer reading 12, a decision to harvest the green Cicer beans is made based on desired tenderometer readings 14. The inventors have observed that a good maturity for commercial production of the green Cicer bean equates to a tenderometer reading between 91 and 149, with a more favorable maturity equaling a tenderometer reading between 118 and 122. The desired tenderometer reading 14 may vary depending on consumer preference. If it is foreseeable that a certain allotment of the harvest will need to be stored prior to processing or if a given harvest will need to be transported distances greater than 75 miles to the processing plant, it is desirable that the green Cicer beans are kept cool after harvest and transported through the use of refrigerated trucks or that other methods such as hydro-cooling are used to prevent against spoilage of the crop after harvest.

A decision 14 to harvest 16 will be made upon data collected from the tenderometer readings and predetermined tenderometer values which can be driven by a variety of factors relating to processing capability, processing timing, and consumer preference. Once the decision to harvest 16 is made, a given stand of green Cicer beans are harvested and the harvested product is loaded in transportation containers 18 and delivered to a processing plant 20. Depending on the distance to the processing plant 20 and any other factors that may affect the time necessary to reach a given processing plant, the storage of the harvested product may be accompanied by cold refrigeration and/or other cooling methods designed to protect the green product from spoilage in the field prior to processing. After the green product is delivered to the processing plant 20, the green product is weighed 21 and cleaned 22. Weighing step 21 records a gross weight on delivery which can be compared to a second weight taken at weighing step 28, after the product has been cleaned 22. The weight recorded at weighing step 28 is the yield weight used by most processors to determine crop value because it records a weight of the green product after unwanted materials have been removed. Cleaning 22 separates unwanted material from the green product. Such unwanted material includes dirt, rocks, stones, leaf and stem trash, and essentially any material other than the green Cicer bean itself.

Figure 3:
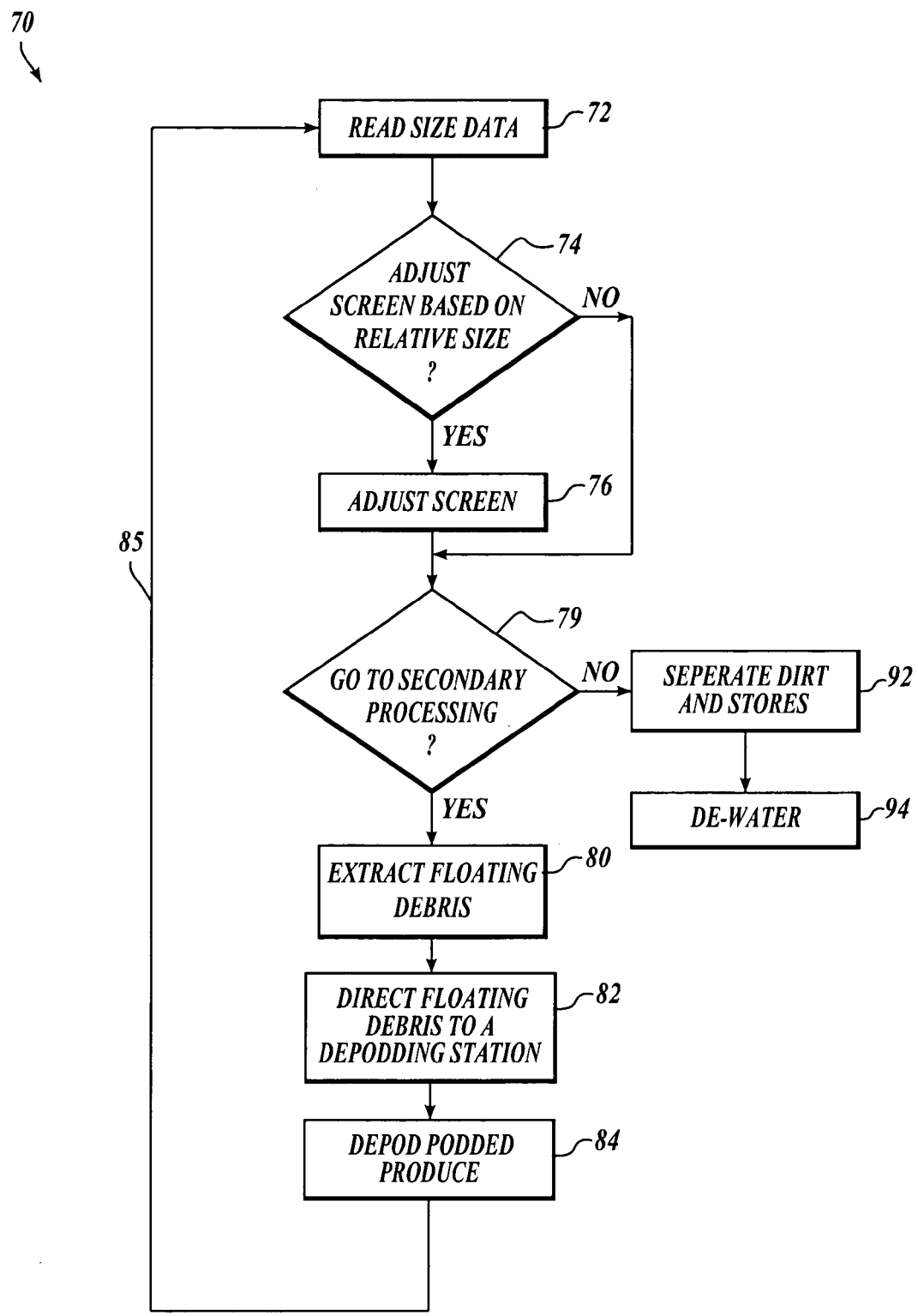
FIG. 3 is a flow diagram of a method for cleaning green Cicer beans in accordance with one embodiment of the present invention incorporating a primary and secondary processing line.
Figure 4:
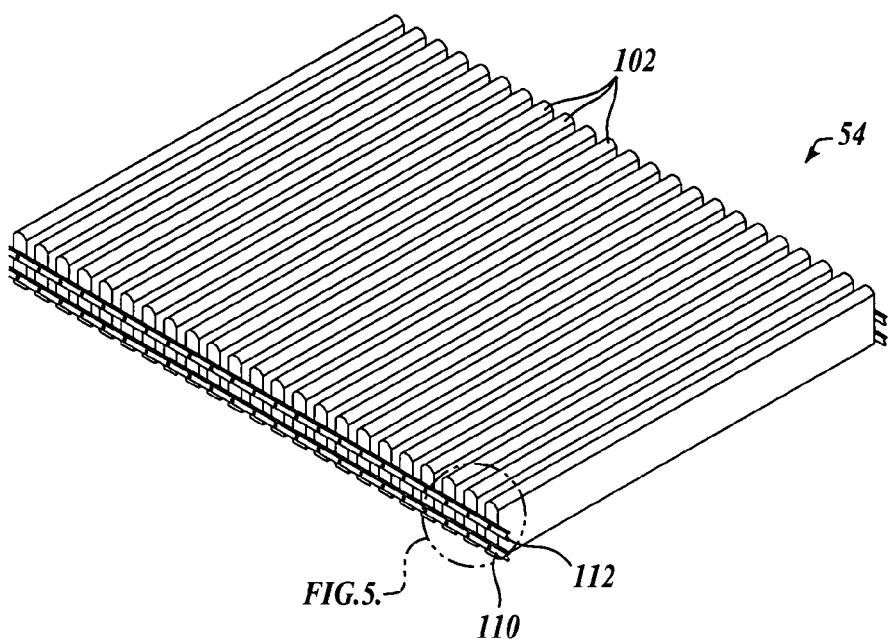
FIG. 4 is an isometric view of a louvered screen utilized by the system shown in FIG. 2 for processing green Cicer beans in accordance with one embodiment of the present invention.

The process of cleaning 22 the product can take on a variety of permutations. FIG. 1 uses a dotted line 24 to indicate that the cleaning step 22 can take on a variety of permutations. Cleaning separates material from the harvest that is not comprised of podded green Cicer beans. Accordingly, green Cicer beans that were not successfully removed from their pods at harvest may be separated during cleaning step 22 along with dirt, stones, leaf trash, and stem trash. A method for cleaning 22 the product in accordance with one embodiment of the present invention is depicted in FIG. 3 and will be described in more detail below with reference to that figure.

With continuing reference to FIG. 1, after the product is cleaned 22, it is put through a series of dewatering stations 26. The dewatering step 26 is accomplished generally through methods of placing the cleaned green product on screens and vibrating the product at a rate sufficient to remove water from the product. Sufficient rates of vibration range between 10 and 20 rpms. After dewatering 26, the green product is weighed 28. The step of weighing 28 is the point at which the food processor will record a harvest yield, and pay the grower based on this weight. Weights recorded at weighing step 28 can be compared to those recorded at weighing step 21 to help determine harvest efficiencies. If the weight recorded at weighing step 28 is not substantially less than the weight recorded at weighing step 21, the harvest was relatively efficient because it was delivered substantially free from unwanted material removed during cleaning step 22.

Following the weighing step 28, the product is put through a series of blanching apparatuses for a blanching step 30. Blanching 30 is a preservation process whereby the product is partially cooked by immersion in hot water, exposed to steam, or exposed to some other energy intensive process. Water blanching is generally of the immersion-type or spray-type as the product moves on a conveyor. Steam blanching often involves belt or chain conveyors upon which the product moves through a tunnel containing live steam. Other methods of blanching include hot gas blanching and microwave blanching. Blanching can account for as high as one third of the total energy required for processing the green product.

During the blanching process 30, certain enzymes having the potential to cause flavor and textural changes should be inactivated. The blanching process 32 inactivates oxidative enzymes such as catalase, peroxidase, polyphenoloxidase, ascorbic acid oxidase, and lipoxygenase. The adequacy of blanching is based on inactivation of one or more of such enzymes. When the unblanched tissue is disrupted or bruised and exposed to air, the aforementioned enzymes come in contact with substrates causing softening, discoloration, and potentially the production of off-flavors. Since enzyme activity can potentially occur during the period prior to freezing, it is most often desirable to blanch the green commodity in order to prevent quality deterioration. Although the primary purpose of blanching is enzyme inactivation, there are several other benefits to blanching 30. Blanching cleanses the product, decreases the microbial load, and preheats the product before further processing. The mild heat treatment of blanching may also soften the green product, facilitating compact packing if such is desired. Intercellular gases in the raw green product are also expelled during blanching, preventing excessive pressure build-up in containers and allowing for improved heat transfer during other steps of heat processing. Consequently, high vacuum can be achieved in the final product as well as a reduction in internal container corrosion. However, some water-soluble nutrients such as ascorbic acid are lost during blanching 30.

The inventors have observed favorable blanch times for the green Cicer beans of between 1 and 5 minutes at temperatures between about 90° F. and 210° F. Still another favorable blanch time and temperature observed by the inventors comprises a blanching dwell time of three minutes and blanching temperatures between about 190° F. and 195° F.

With continuing reference to FIG. 1, after the blanching step 30, the green product to be processed can be inspected by hand on the processing line 32. This inspection 32 can be done visually to separate damaged or otherwise unwanted materials from the processed batch. Additionally or alternatively, line inspection 32 can be conducted through the use of known machine vision techniques and apparatuses. A suitable machine vision apparatus useable with this particular embodiment could employ a laser or "electronic eye" or optionally, the machine vision apparatus could use a digital camera or analog camera, or any other means for assessing and collecting data regarding size of the product or other attributes such as color and structure. The green product is inspected according to a predetermined desirable size or color and therein separation can be done through mechanical or other means including pressurized air directed in a stream to separate unwanted beans or other material from the green product. Following line inspection 32, the product can be further preserved by a flash-freezing tunnel wherein the product is spread on conveyors and individually flash-frozen prior to packing. Optionally, a second inspection is conducted after freezing to ascertain the individual character of each frozen processed product and to detect unwanted clumping or unsuccessful individual freezing in the batch of green product processed. Unwanted frozen green product is separated manually or by other mechanical means and potentially, detection of unwanted frozen green product is done by machine vision.

Following freezing 34, the product is graded 36 according to consumer-specified criteria relating to tenderness, texture, color, and similar attributes. Consumer-grade green Cicer beans should be of an even green color when thawed and should have the characteristic beak-like structure of the bean intact. Regarding color, the thawed bean should not have a color substantially different from the color observed at harvest. The seed coat of the processed and thawed green Cicer bean should be substantially undamaged and the bean should generally be free of any nicks, cuts, scrapes or the like. Further, the tenderness of the processed green Cicer bean should be similar to the tenderness observed prior to harvest as read by the field tenderometer. In one embodiment, tenderness of the green Cicer beans following processing is graded by comparing tenderometer readings, batch by batch, to tenderometer readings observed in the field. Accordingly, a suitable grading scheme for the green Cicer bean in accordance with the disclosed processing method includes measurements of tenderness, color, seed structure, condition of the seed coat, and taste. Based on these criteria, grading schemes ranging from the highest grade to the lowest acceptable consumer grade may be assigned to the processed beans. After a batch has been graded 36, the product is then packaged 38 and delivered to markets or stored for subsequent sale and delivery.

As an alternative to freezing 34, the green Cicer beans may be preserved by dehydration. The inventors have determined favorable dehydration parameters for the green Cicer bean. According to methods and apparatuses of the present invention, favorable dehydration parameters for the green Cicer bean should yield about 3.5 pounds of dehydrated green Cicer beans upon processing about 11 pounds of harvested green Cicer beans. Put another way, dehydration of the green Cicer bean may be conducted such that final weight of the dehydrated product is approximately 12% of the initial fresh weight. The inventors have also observed favorable initial temperature times for dehydration between about 120° F. and 190° F. with still another preferred temperature range initially being between about 165° F. to 169° F. Favorable final dehydration temperatures for the green Cicer bean range between about 120° F. and 190° F. with still another favorable range for dehydration of the green Cicer bean being between about 138° F. and 142° F. Favorable moisture content for the dehydrated green Cicer bean product according to the disclosed embodiments is between about 1% and 10% moisture content with still another favorable range of acceptable moisture content for the dehydrated green Cicer bean being between about 4% and 6%. Finally, preferred dwell times for dehydration of the green Cicer bean are between about 2 and 10 hours with still another favorable dwell time being between about 3.5 and 4.5 hours. Dwell time will naturally vary based on initial and final temperatures as discussed with reference to the preferred values previously. The present invention accordingly is not limited to the described temperatures and dwell times and one of ordinary skill in the art will appreciate that dwell time can be varied with a corresponding change in initial or final dehydration temperature.

Figure 2:
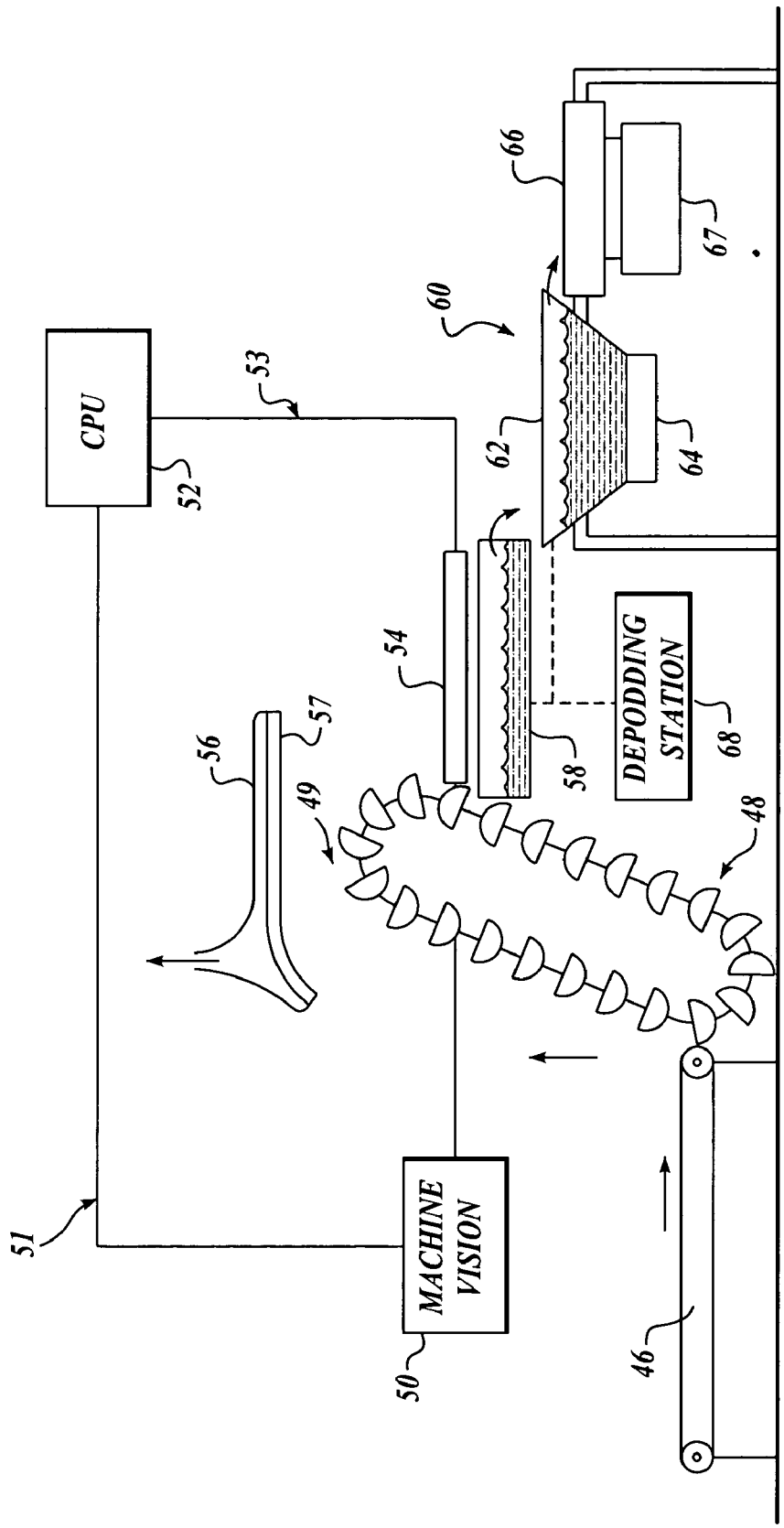
FIG. 2 is a schematic representation of a system for processing green Cicer beans in accordance with one embodiment of the present invention.

With reference now to FIG. 2, one embodiment of a suitable system for processing green Cicer beans is explained. The embodiment depicted by FIG. 2 includes an initial conveyor belt 46 responsible for transporting green Cicer beans (or any other podded produce) to bucket elevator 48 after the harvested beans are dropped off at the processing plant. A typical green Cicer bean harvest will be comprised mostly of depodded green Cicer beans (i.e., green Cicer beans that have been shelled or "depodded" through mechanical threshing techniques). Suitable mechanical threshing techniques for the green Cicer bean are described in concurrently filed application Ser. No. 10/714,409, now issued as U.S. Pat. No. 6,960,131, and that application is hereby incorporated by reference in its entirety. In any mechanical harvest of a leguminous crop, it is not uncommon to collect "unthreshed" product, or product that is still securely held within a pod. In addition to unthreshed beans, a harvested green Cicer crop delivered to a processing plant will have dirt, stones, and other debris, including leaf trash and stem trash which must be separated from the threshed green Cicer beans prior to weighing the load to determine yield. Traditional processing of green legumes does not provide an opportunity to increase yields by offering a second chance to depod or thresh the product after harvest and delivery to a processing plant. Green Cicer beans within the tight leathery pod capture air and float. Consequently, there is an opportunity for secondary processing, through which yields may be increased by removing pods from podded produce after delivery to the processing plant. Methods for secondary processing, including depodding the un-threshed Cicer beans at a secondary processing line, are part of the invention and are described in greater detail with reference to FIG. 3.

With continuing reference to FIG. 2, the specific arrangements of the conveyor belts do not limit the invention. One of ordinary skill will appreciate that there can be a variety of ways to move the green product through the processing line. According to the embodiment depicted in FIG. 2, however, green Cicer beans are transported by conveyor belt 46 and dumped into bucket elevator 48. While in bucket elevator 48, a machine vision apparatus 50 is placed in a position to monitor and read product attributes such as size and color and relay this information to a central processing unit 52 by way of network connection 51. As briefly mentioned above, a suitable machine vision apparatus usable with this particular embodiment could employ a laser or "electronic eye" or optionally, the machine vision apparatus could utilize a digital camera or analog camera, or any other means for assessing and collecting data regarding size and color of the green product. Using size information read by machine vision apparatus 50, the central processing unit 52 determines the appropriate apertures for a filter comprised of a screen 54 and communicates this information via network connection 53. Screen 54 is adjustable in response to size data relayed by central processing unit 52 such that the apertures of screen 54 are adjusted to permit passage of green Cicer beans therethrough and into water container 58. A suitable screen 54 usable with the depicted embodiment is described in greater detail with text referencing FIGS. 4-7 below. In general, a suitable screen 54 can be constructed through the use of a plurality of elongated louver elements disposed in parallel, pivoting about a plurality of base axis points 104. The screen 54 may thereby operate like a horizontally disposed shutter, creating a variety of variable apertures or openings through which green Cicer beans can be filtered and dropped through to container 58, and thus, be separated from larger materials such as leaf and stem trash which cannot pass through the screen 54. The apertures or louver elements 102 of louvered screen 54 (depicted in FIGS. 4-7) are selectively adjusted based on the relative sizes of the vegetables to be processed, i.e., the openings between the plurality of louver elements 102 will vary to permit vegetables of a desired size to pass therethrough.

With continuing reference to FIG. 2, a negative air, hooded blower 56 is situated near the point at which the produce is dumped onto adjustable louvered screen 54. Hooded blower 56 uses negative air to pull Cicer beans and other trash upwardly. Through a negative air sucking force, lighter materials are removed from the produce to be processed. Furthermore, green product to be processed is substantially evenly mixed and substantially evenly dispersed onto screen 54 by being first pulled from bucket elevator 48 at point 49, potentially striking a screen 57, prior to being dispersed onto screen 54. The negative air force helps to evenly mix the produce prior to dispersement onto screen 54, which will occur after gravity acts upon heavier elements of the produce. It is desirable that the amount of negative air moving through blower 56 be sufficient in strength to mix the product and thoroughly disperse the product onto screen 54; however, these forces should not be strong enough to actually pull green Cicer beans through hooded blower 56. Through the use of a negative air, hooded blower 56 and screen 57, the hood and screen will remove lighter trash and disperse the remaining, heavier product substantially evenly on screen 54.

Water container 58 is situated to clean the green produce that passes through adjustable screen 54 by permitting heavy, unwanted material to sink. A heavier unwanted material that sinks within water 58 includes rocks and stones which sink at a faster rate than podded green Cicer beans which are permitted to flow into a flotation washer device 60. The flotation washer device 60 utilizes water connected to a pumping source and the water 62 flows through the flotation tank 64 and onto a dewatering screen 66 where water is removed from the product prior to weighing. A suitable flotation washer device 60 usable with the depicted embodiment is available from the Olney Company, Model 60, which employs a 60-inch wide tank and has a capacity of seven tons of produce per hour. A flotation washer 60 usable with the present invention may be equipped with a 6×6 pump and a flotation tank 64 and a recovery tank 67.

Water container 58 can also be in fluid communication with a secondary processing line, explained more fully below with reference to FIG. 3. Secondary processing as explained below can include a depodding station 68 whereby floating debris including unpodded green Cicer beans can be liberated from their pods and returned to conveyor 46 for further processing.

With reference now to FIG. 3, a flow diagram showing a method 70 for cleaning green Cicer beans in accordance with one embodiment of the present invention is depicted. The method 70 begins by reading size data 72 of the green Cicer beans to be processed. As mentioned previously, size data 72 can be read through the use of a machine vision apparatus 50 (depicted in FIG. 2 schematically). Additionally, machine vision techniques can be used to read color or any other attributes readable by a machine. Data read by a machine vision apparatus is then processed by a central processing unit 52 (also depicted schematically by FIG. 2). Once size data 72 is read, a decision 74 to adjust the screen is made. The decision 74 to adjust the louver elements of screen 54 is based on the size of the green Cicer beans to be processed and will in general adjust 76 the louver elements 102 of screen 54 to a distance permitting Cicer beans to pass therethrough and to also catch larger unwanted materials and prevent the same from passing therethrough. The decision 74 to adjust 76 could be based on size data capturing, for example, 100% of the green Cicer beans. In other words, an adjustment sufficient to permit the passage of up to 100% of the green Cicer beans could be made, or alternatively another smaller portion of the green Cicer beans could be separated if it is determined that only smaller green Cicer beans are to be processed at a given point in processing. A desirable portion could for example equal only 10% of an allotment of green Cicer beans to be processed or, for example 90%. A plurality of screens such as screen 54 may be disposed at various points in processing to sort and separate various sizes of green product for further processing on a size-specific basis. The decision 74 to adjust 76 is therefore varied depending on the desired portion of green Cicer beans to be separated. If data regarding size indicates that the louver elements 102 of screen 54 are at a sufficient level of opening to accommodate the current desired size of green Cicer beans to be processed, no adjustment is needed.

If the screen 54 does not require adjustment, or after the screen is adjusted 76, a decision 79 to enter secondary processing is made. As noted above, there is an opportunity to increase yields by offering a second (or perhaps third, fourth, etc.) opportunity to depod the product. Accordingly, if a decision 79 to enter secondary processing is made, the green product is subject to an extraction process 80, more specifically, floating debris found on a body of floating water located below adjustable screen 54 in water container 58 or flotation washer 60 is extracted. If, however, decision 79 indicates that secondary processing is not necessary, dirt and stones will be separated from the green product through use of a flotation washer 60, discussed above. Following separation of dirt and stones 92, the green Cicer beans are placed on a dewatering screen and dewatered 94.

Returning to block 80 of FIG. 3, floating debris including unthreshed green Cicer beans (which float) may be extracted 80 using a variety of mechanical means which can optionally scrape the floating debris from the surface of water or alternatively divert a portion of the water also carrying floating debris and unthreshed green Cicer beans. The floating debris is then directed to a depodding station 82 and the produce is subsequently depodded 84 and returned to primary processing, e.g., to the conveyor belt 46 as indicated by loop 85. Accordingly, secondary processing, e.g., blocks 80-84, can be carried out multiple times if desired. Depending on the amount of unthreshed green Cicer beans delivered to the processing plant, secondary processing can be used in accordance with method 70 to increase overall grower yield.

Once at the depodding station (depicted schematically in FIG. 2 as element 68), the product is depodded. Depodding may be accomplished through a variety of threshing means. Example threshing means include a sieved drum with a central beater and a variety of satellite beaters using percussive beating devices designed to open the pods of the green Cicer beans and liberate the green commodity. Additional means for threshing include depodding the green Cicer beans with blending-type apparatuses which contain floating debris and unpodded Cicer beans in a container with multiple beaters designed to open the pods through percussive forces while the pods and other floating debris are immersed within water. One skilled in the art will recognize that there are a variety of ways to depod podded produce and that the mentioned means are not limiting.

With reference now to FIGS. 4-7, the adjustable louvered screen 54 is described in greater detail. As noted above, the green product is passed through the louvered screen 54 during processing in order to assist removal of unusable debris and separate out podded product. Adjustable louvered screen 54 includes a plurality of louver elements 102. Louver elements 102 are generally elongated and disposed parallel to one another. In operation, louver elements 102 are open and shut much like blinds on a window whereby the individual louver elements 102 are rotatably closed in shutter-like fashion and subsequently opened to permit passage of objects therethrough.

Figure 5A:
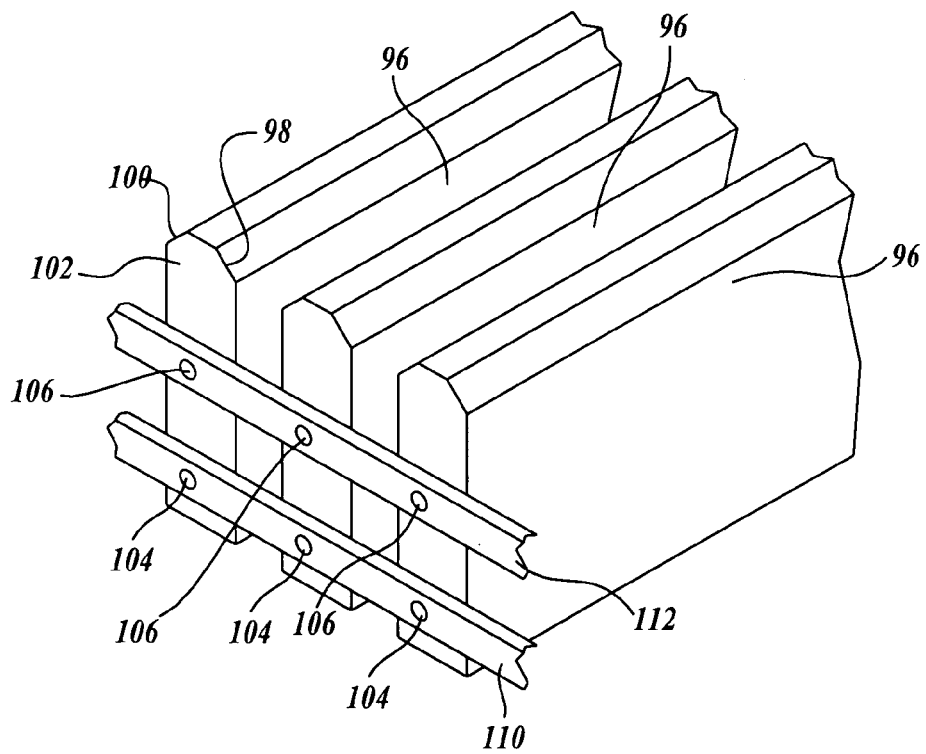
FIG. 5A is an isometric view of a portion of the louvered screen depicted in FIG. 4 showing individual louvers in more detail.

As seen best in FIG. 5A, louver elements 102 may have beveled top edges. Beveled top edges of louver elements 102 aid in catching the green Cicer bean and permitting passage through the screen. A variety of angles can be used to create a generally beveled top surface for louver elements 102 sufficient to catch the green Cicer bean and permit passage of the same through screen 54. Angled top sides 100 and 98 of the louver elements 102 in this particular embodiment are at a 45° angle 108 from the inside surface of the individual louver elements 102, as shown best by FIG. 6, however, other angles may be implemented.

Figure 5B:
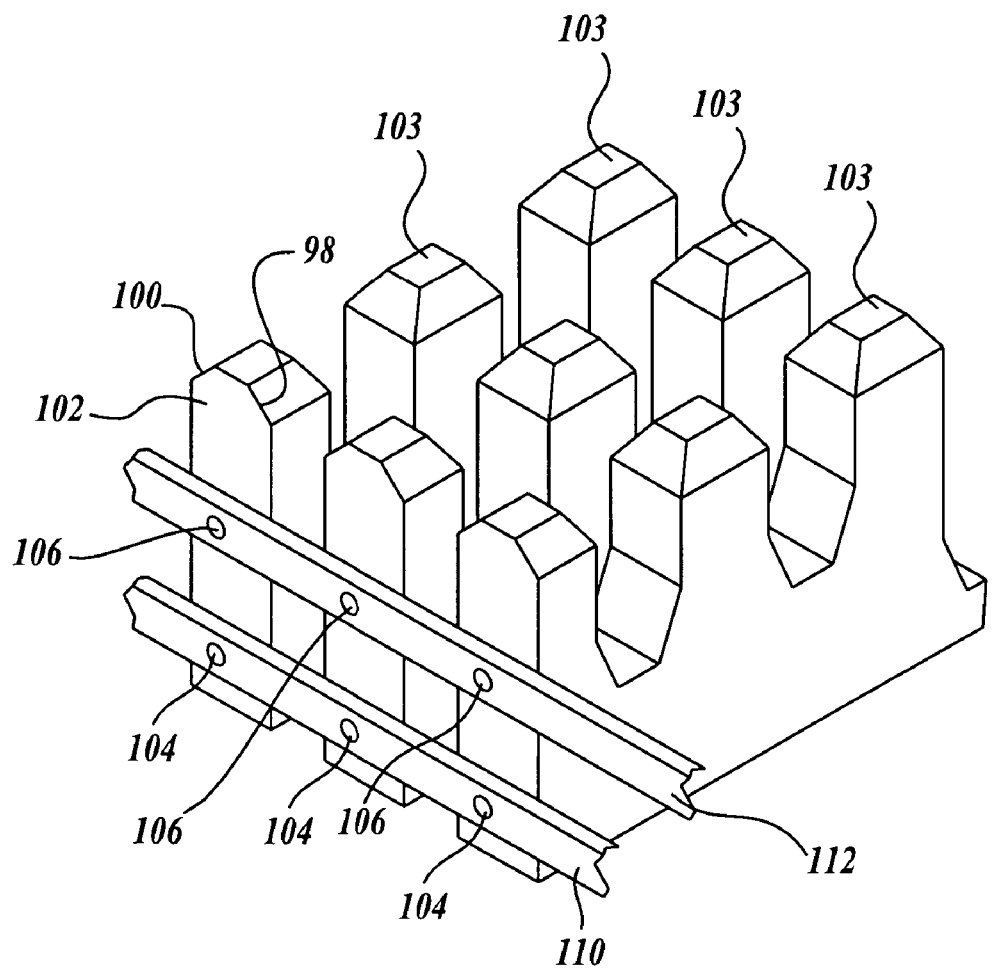
FIG. 5B is an isometric view of a portion of a louvered screen useable with one embodiment of the invention, showing serrated louvers.

In another embodiment, depicted in FIG. 5B, louver elements 102 have serrated top sides 103. Serrated top sides 103 may be configured or "notched" lengthwise along louver elements 102 at pre-determined distances, such as every ¼ inch, thereby creating a plurality of knobs and edges which increases the overall surface area of the top side of screen 54. Serrated top sides 103 can be used to help catch green Cicer beans and direct them through screen 54. Additionally, serrated top sides 103 can "snag" trash that may otherwise slip through screen 54. A variety of angles may be used to create serrated top sides 103.

Adjustable louvered screen 54 is disposed generally in a horizontal plane. The disposition of screen 54 can be at a variety of angles off of horizontal, so long as the vegetables to be processed do not roll off screen 54 and are permitted to pass through louvered elements 102. It is important to note that louver elements 102 are just one example of suitable means for creating a screen with adjustable openings. For example, adjustable openings can be created through the use of individual sieve elements that are adjustable in a kaleidoscope, collapsible fashion.

In operation, the louvered screen 54 is actuated through arm 112 which is rotatably connected to louver elements 102 at points 106. Operation of screen 54 is depicted best in FIGS. 6 and 7 where the arm 112 is used to close or open the louver elements 102 about axis points 104, located on base member 110. Axis points 104 are fixed in both a horizontal and vertical plane, and louver elements 102 rotate about each individual axis point 104 until a desired aperture or opening 118 is achieved. Desired opening 118 creates a funnel-like opening space 120, depicted by dotted lines in FIG. 7. Funnel-like opening space 120 is an area where green Cicer beans (or any other podded produce) can be caught between the beveled angle top edges 100 and 98 of the louver members 102.

When the louvered screen 54 is in a desired position, opening 118 is created based on information regarding the sizes of green product to be processed. The opening 118 will be of a size that is suitable for catching green product among beveled tops 100 and 98 and also suitable for directing them through a channel 116 and through the screen 54 onto a body of flowing water 58 (shown in FIG. 2) where further cleaning and separating can be achieved.

Figure 6:
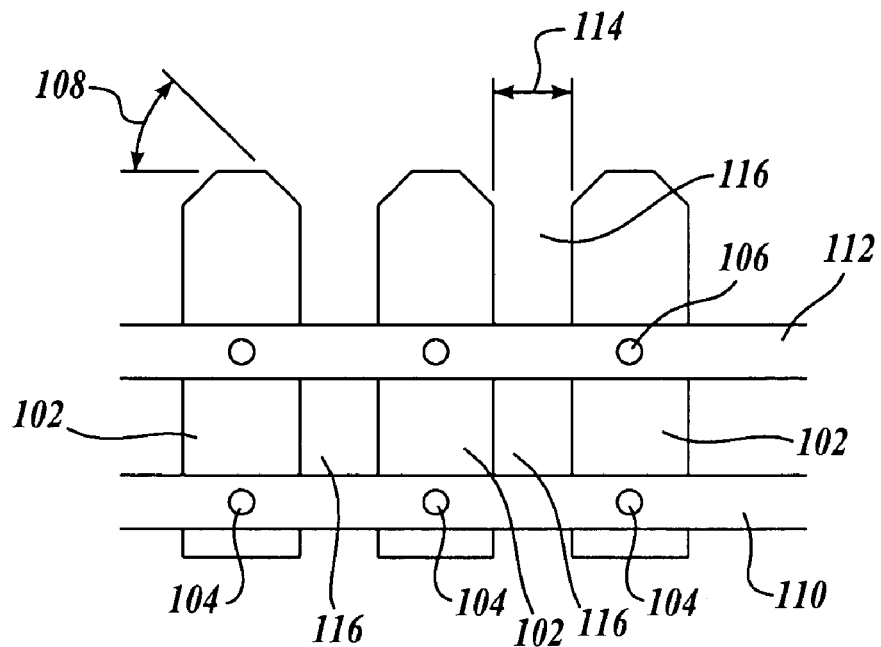
FIG. 6 is a planar side view of a portion of the louvered screen depicted in FIG. 4.
Figure 7:
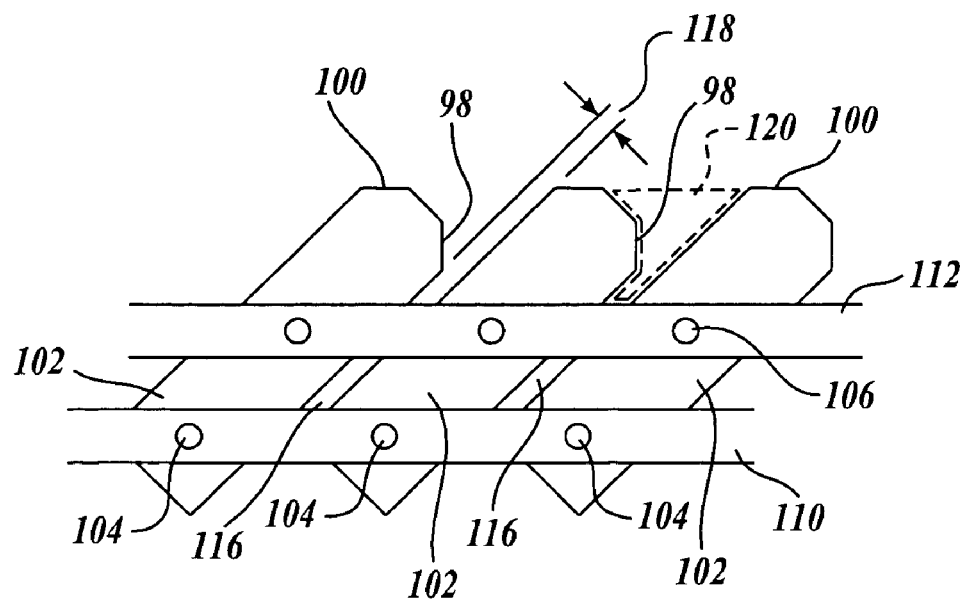
FIG. 7 is another side planar view of a portion of the louvered screen depicted in FIG. 4, showing the louvered screen in another position.

With reference now to FIG. 6, louvered screen 54 is shown in a fully open position. The fully open position shown by FIG. 6 includes a channel 116 that will be the largest possible channel, having a distance 114 between louver elements 102. Distance 114 and consequently, channel 116 can vary based on construction of the louvered screen, and it is desirable that distance 114 be of a maximum size to permit the passage of the largest varieties of green produce being processed, such as large Kabuli-type green Cicer beans, and to separate trash or other material intended to be kept out of further processing stages, such as flotation washing. Channel 116 can be constructed and sized based on distance 114 which is determined using information about the nature of the trash and other unwanted material to be separated from the produce. Furthermore, channel 116 may be of a size permissible to allow unpodded produce to pass through and be caught by washer 58 wherein secondary processing, such as that described with reference to FIG. 3, can take place. A favorable maximum spacing for channel 116 equates to a distance 114 between louver elements 102 of one inch. With further reference to FIGS. 4-7, the adjustable louvered screen 54, constructed in accordance with the depicted embodiment can also be connected to vibrating mechanisms to aid passage of material through the louvered screen 54 and onto further stages of processing.

While the preferred embodiment of the invention has been illustrated and described, it will be appreciated that various changes can be made therein without departing from the spirit and scope of the invention.

The invention claimed is:

1. A method for commercial processing of green Cicer beans, the method comprising:
    taking a field tenderometer reading of a sample Cicer bean;
    harvesting green Cicer beans when the sample tenderometer reading is between 91 and 149;
    separating said green Cicer beans from harvested green Cicer bean product;
    cleaning said green Cicer beans;
    preserving said green Cicer beans;
    grading said green Cicer beans according to predetermined criteria; and
    packaging said green Cicer beans.

2. The method of claim 1, wherein preserving said green Cicer beans comprises blanching said green Cicer beans at a predetermined temperature and for a predetermined dwell time.

3. The method of claim 2, wherein preserving said green Cicer beans further comprises testing for enzyme activity after blanching and adjusting said predetermined temperature during blanching based on enzyme activity.

4. The method of claim 2, wherein blanching said green Cicer beans comprises testing for enzyme activity after blanching and adjusting said predetermined dwell time during blanching according to enzyme activity.

5. The method of claim 2, wherein said predetermined dwell time is between 1 and 5 minutes and said predetermined temperature is between 90° F. and 210° F.

6. The method of claim 2, wherein the predetermined temperature is between 190° F. and 195° F. and the predetermined dwell time is about 3 minutes.

7. The method of claim 1, wherein preserving said green Cicer beans comprises freezing said green Cicer beans.

8. The method of claim 1, wherein preserving said green Cicer beans comprises dehydrating said green Cicer beans.

9. The method of claim 1, wherein separating green Cicer beans from harvested green Cicer bean product comprises:
    collecting data regarding the relative sizes of said green Cicer beans; and filtering harvested green Cicer bean product to separate green Cicer beans of at least a predetermined size from the harvested green Cicer bean product.

10. The method of claim 1, wherein cleaning said green Cicer beans comprises:
   collecting said green Cicer beans in a body of water; and
   removing any material floating on said body of water.

11. The method of claim 10, further comprising repeating the steps of collecting said green Cicer beans in a body of water and removing any material floating on said body of water.

12. A method for the commercial processing of green Cicer beans comprising:
   taking a field tenderometer reading of a sample Cicer bean;
   harvesting green Cicer beans when the sample tenderometer reading is between 91 and 149;
   delivering harvested green Cicer bean product;
   filtering said harvested green Cicer bean product through a vibrating screen to remove depodded green Cicer beans from said harvested green Cicer bean product;
   cleaning said depodded green Cicer beans;
   preserving said depodded green Cicer beans; and
   grading said depodded green Cicer beans according to predetermined criteria.

13. The method of claim 12, further comprising collecting size data for depodded green Cicer beans.

14. The method of claim 13, wherein filtering said harvested green Cicer bean product comprises adjusting said vibrating screen according to the collected size data.

15. The method of claim 12, wherein cleaning said depodded green Cicer beans comprises:
   depositing said depodded green Cicer beans in a body of water; and
   removing any material floating on the body of water, wherein said floating material may include podded green Cicer beans.

16. The method of claim 15, further comprising depositing said depodded Cicer beans in a body of water a second time, and again removing any material floating on the body of water.

17. The method of claim 12, wherein preserving said depodded green Cicer beans comprises dehydrating said depodded green Cicer beans.

18. The method of claim 17, wherein said depodded green Cicer beans are dehydrated with initial temperatures ranging between 120° F. and 190° F. and final temperatures ranging between 120° F. and 190° F. with a dwell time between 2 and 10 hours.

19. The method of claim 17, wherein said depodded green Cicer beans are dehydrated to a final moisture content between 1% and 10%.

20. The method of claim 17, wherein said depodded green Cicer beans are dehydrated to approximately 12% of an initial product green weight.

21. The method of claim 12, wherein preserving said depodded green Cicer beans comprises freezing said depodded green Cicer beans.

22. The method of claim 12, wherein preserving said depodded green Cicer beans comprises blanching said depodded green Cicer beans. pg,23

23. A method for the commercial processing of green Cicer beans comprising:
   taking a field tenderometer reading of a sample Cicer bean:
   harvesting green Cicer beans when the sample tenderometer reading is between 91 and 149; and
   filtering harvested green Cicer bean product through an adjustable screen, wherein said adjustable screen has a plurality of spaced louvers, and wherein said plurality of louvers are selectively adjusted based on the relative sizes of the green Cicer beans to be processed.

24. The method of claim 23, further comprising vibrating said adjustable screen at a predetermined vibration rate.

25. The method of claim 23, further comprising:
   collecting data regarding the relative sizes of the green Cicer beans to be processed prior to filtering the harvested green Cicer bean product through the adjustable screen; and
   selectively adjusting said adjustable screen based on said data.

26. The method of claim 23, further comprising:
   collecting data regarding the relative sizes of the green Cicer beans to be processed during filtering of the harvested green Cicer bean product through the adjustable screen; and
   selective adjusted said adjustable serene on said data.

* * * * *

UNITED STATES PATENT AND TRADEMARK OFFICE
CERTIFICATE OF CORRECTION

PATENT NO. : 7,449,206 B2
APPLICATION NO. : 10/714446
DATED : November 11, 2008
INVENTOR(S) : T. D. Moser et al.

It is certified that error appears in the above-identified patent and that said Letters Patent is hereby corrected as shown below:

| COLUMN | LINE | ERROR |
|---|---|---|
| 12 (Claim 1, | 33-34 lines 4-5) | "tenderom-eter" should break --tendero-meter-- |
| 13 (Claim 12, | 15-16 lines 4-5) | "tenderom-eter" should break --tendero-meter-- |
| 14 (Claim 22, | 17 line 3) | delete "pg,23" |
| 14 (Claim23, | 21-22 lines 4-5) | "tenderom-eter" should break --tendero-meter-- |
| 14 (Claim 26, | 42 line 6) | "selective" should read --selectively-- |
| 14 (Claim 26, | 42 line 6) | "adjusted" should read --adjusting-- |
| 14 (Claim 26, | 42 line 6) | "serene" should read --screen-- |

UNITED STATES PATENT AND TRADEMARK OFFICE
CERTIFICATE OF CORRECTION

PATENT NO. : 7,449,206 B2
APPLICATION NO. : 10/714446
DATED : November 11, 2008
INVENTOR(S) : T. D. Moser et al.

It is certified that error appears in the above-identified patent and that said Letters Patent is hereby corrected as shown below:

| COLUMN | LINE | ERROR |
|---|---|---|
| 14 (Claim 26, | 42 line 6) | "on said data." should read --based on said data.-- |

Signed and Sealed this

Twenty-fifth Day of August, 2009

David J. Kappos
*Director of the United States Patent and Trademark Office*